Dec. 24, 1940.  E. P. SEXTON  2,225,716
FLUID TYPE INERTIA DEVICE
Filed March 31, 1939  2 Sheets-Sheet 1
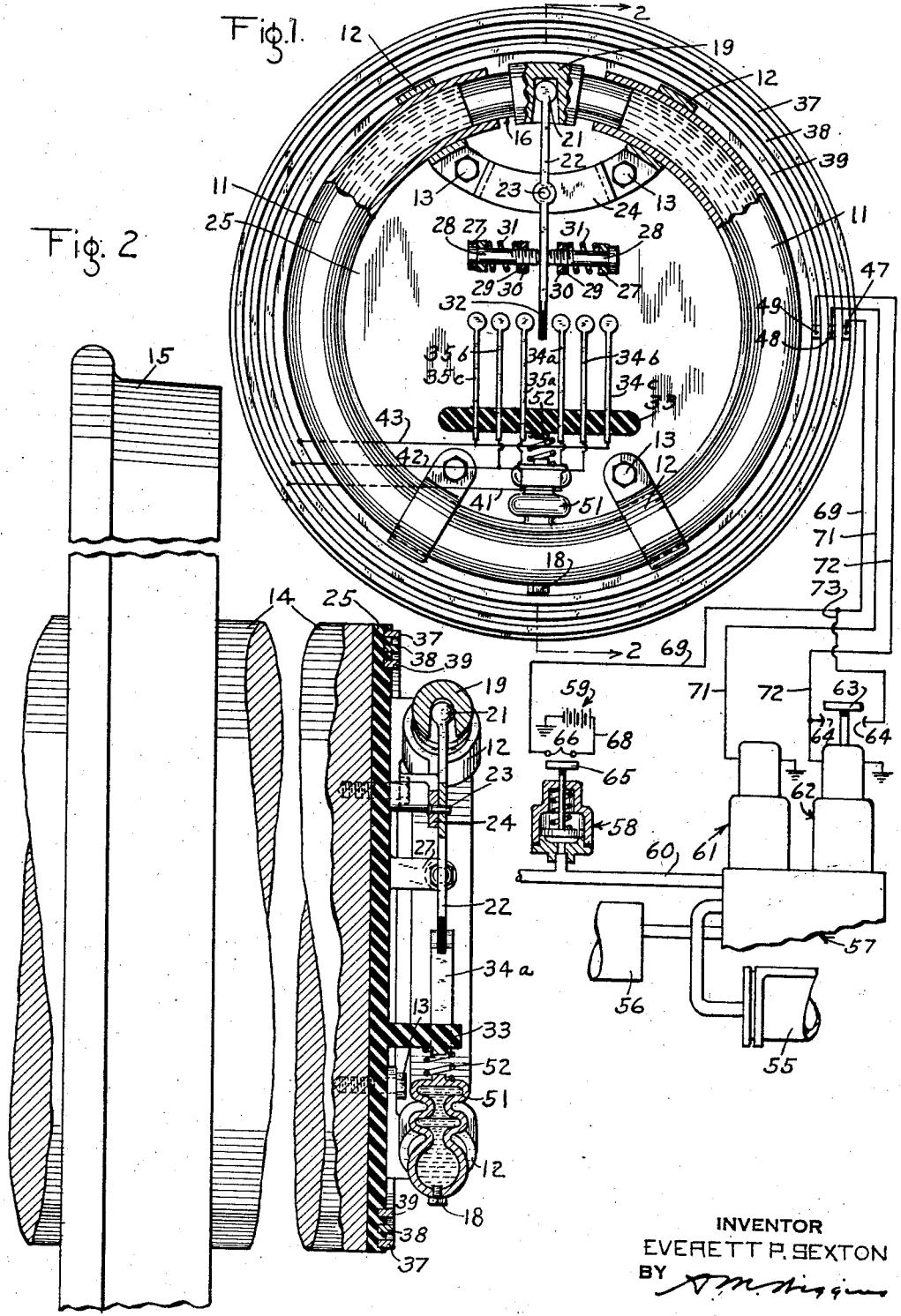
INVENTOR
EVERETT P. SEXTON
BY 
ATTORNEY Dec. 24, 1940.　　　　E. P. SEXTON　　　　2,225,716
FLUID TYPE INERTIA DEVICE
Filed March 31, 1939　　　　2 Sheets-Sheet 2
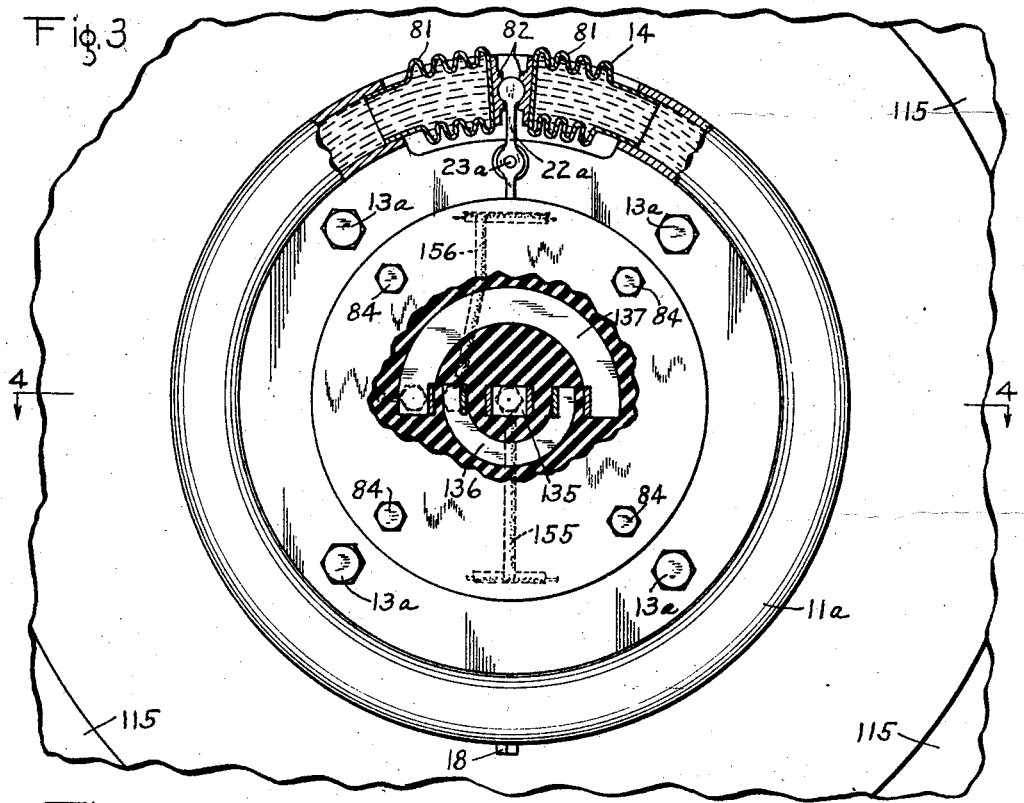
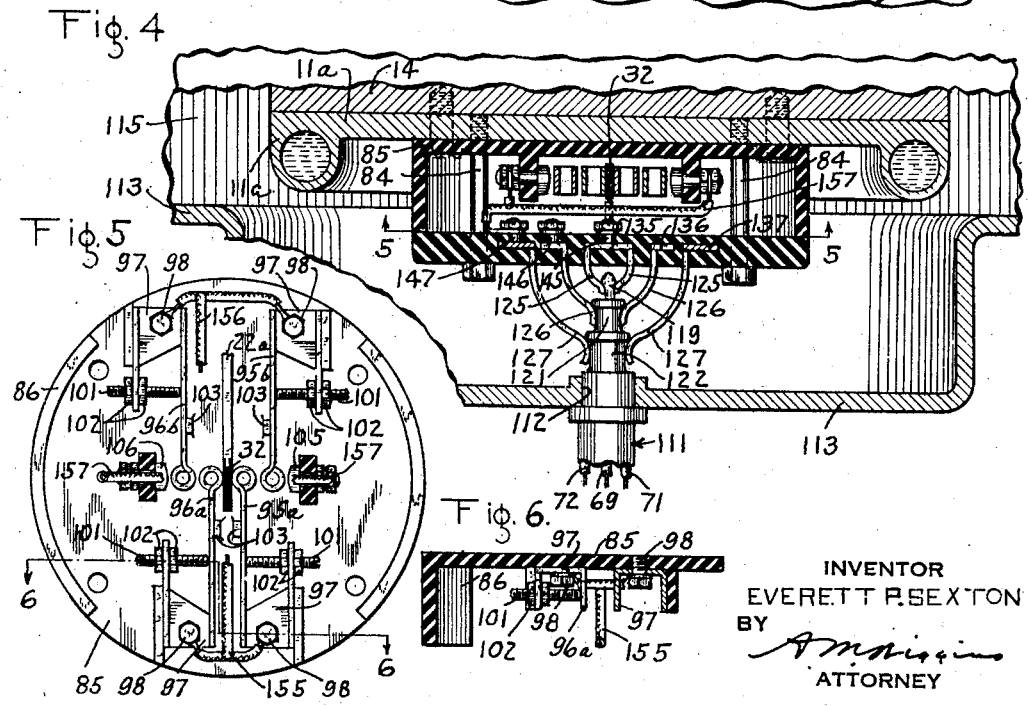
INVENTOR
EVERETT P. SEXTON
BY
ATTORNEY Patented Dec. 24, 1940

2,225,716

UNITED STATES PATENT OFFICE 2,225,716

FLUID TYPE INERTIA DEVICE

Everett P. Sexton, East McKeesport, Pa., assignor to The Westinghouse Air Brake Company, Wilmerding, Pa., a corporation of Pennsylvania Application March 31, 1939, Serial No. 265,173

16 Claims. (Cl. 200—52)

This invention relates to fluid type inertia devices and has particular relation to fluid type inertia devices responsive to the rate of change of rotative speed of a rotating element to control the operation of a signal device or other mechanism, such as brake apparatus associated with the rotating element.

It is an object of my invention to provide a device of simple and sturdy construction as well as low cost which may be associated with a rotating element in a manner to register the rate of change of speed thereof.

More specifically, it is an object of my invention to provide a device including means for confining a fluid body of high specific gravity, such as mercury, in an annular tubular chamber and suitably mounting such means for rotation about a central axis; and in further providing an operating or control mechanism which is responsive to the force of inertia of the annular column of fluid, upon changes in the rate of rotation of the column, for effecting operation of a signal device or some other type of control mechanism.

Further details of my invention, as well as other objects of my invention, will be made apparent in the subsequent detailed description thereof when read in connection with the accompanying drawings, wherein Fig. 1 is a diagrammatic view, showing one embodiment of my invention and an illustrative application thereof in a vehicle brake control equipment.

Fig. 2 is a vertical sectional view taken on the line 2—2 of Fig. 1, showing further details of construction as well as a manner of mounting the device at the end of a car wheel axle, Fig. 3 is a view, showing another embodiment of my invention and its associative relation to the journal for the car wheel axle, Fig. 4 is a fragmental sectional view, taken on the line 4—4 of Fig. 3, showing further details of construction, Fig. 5 is a view, taken on the line 5—5 of Fig. 4, showing further details of construction, and Fig. 6 is a sectional view, taken on the line 6—6 of Fig. 5.

*Description of embodiment shown in Figs. 1 and 2*

Referring to Figs. 1 and 2, the embodiment shown comprises an annular tube 11 of suitable rigid material, such as metal, secured as by a plurality of clamps or brackets 12 and corresponding screws 13 to the end of a shaft or other rotating element, shown in Fig. 2 as the axle 14 to which a car wheel 15 is fixed, in a manner so as to be rotated on an axis that intersects the center of curvature of the tube and that is coincident with the axis of rotation of the axle.

The annular tube 11 is open at one point therein and a movable abutment, such as an arcuate plunger or piston element 16, is arranged between the spaced ends of the tube in a manner that the opposite ends of the plunger slidably engage within the two opposite ends of the tube 11 in close fitting and sealed relation. While not shown, it will be understood that suitable packing or sealing ribs or rings may be provided on the plunger 16 to prevent leakage of the fluid from the tube past the plunger.

A suitable tapped opening may be provided in the wall of the tube whereby fluid may be introduced into the tube, and a screw plug 18 provided for closing the opening after the tube is filled with fluid.

The plunger 16 is formed, at a point between the ends of the tube 11, with a recessed or yoke portion 19 for receiving a ball-shaped knob 21 on the end of a lever 22 that is pivoted, intermediate the ends thereof, on a pin 23 carried by an arcuate connecting strut 24 that is formed with or attached at opposite ends thereof to two of the brackets 12 adjacent the ends of the tube 11.

Interposed between the brackets 12 and the outer end of the axle 14 is a base member 25 of insulating material, through which the securing screws 13 for the brackets extend. Formed as a part of or attached to the insulating base 25 are a pair of projecting lugs 27 arranged in spaced symmetrical relation on opposite sides respectively of the inner end of the lever 22. Slidably carried by each of the lugs 27 is a plunger 28, each plunger having a head at one end and being threaded at the opposite end. Each of the plungers 28 is provided on the threaded end thereof with a nut and lock nut 29 and 30 respectively, and interposed between the nut 29 and the lug 27 is a coil spring 31 which urges the plunger 28 toward the lever 22 to effect the simultaneous engagement of the head of the plunger with the lug 27 and of the threaded end of the plunger with the lever. The arrangement of the two plungers 28 and the location of the lugs 27 is such that the lever 22 is centered in a normal position midway between the lugs 27.

By means of the nuts 29 and 30, the coil springs 31 may be adjusted in tension so that the plungers 28 resist the pivotal movement of the lever 22 out of its normal position with different desired degrees of force. As will be explained more fully hereinafter, when the inertia device is employed in connection with a vehicle brake control equipment, the tension of the springs 31 may be adjusted to a degree so as to prevent pivotal movement of the lever 22 out of its normal centered position in response to the inertia force of the annular fluid column within the tube 11 acting through the plunger 16 on the outer end of the lever 22, unless the rotative deceleration or acceleration of the vehicle axle 14 and wheel 15 exceeds a certain rate, such as a rate corresponding to a rate of retardation or acceleration of the vehicle of seven miles per hour per second.

Suitably fixed in a row on a projecting shelf 33 forming a part of the insulating base 25 are a plurality, shown as six, of contact fingers 34a, 34b, 34c, 35a, 35b and 35c. The contact fingers are arranged in two groups of three each on opposite sides respectively of the inner end of the lever 22 which is provided with a suitable insulating tip 32 that extends between the inner two of the contact fingers.

The contact fingers are of suitable flexible resilient character, or they may have biasing springs associated therewith, so that normally the outer or free end of the contact fingers are disengaged from one another. Thus, when the lever 22 is pivoted in a counterclockwise direction from its normal position shown in Fig. 1, the tip end 32 of the lever 22 engages contact finger 34a and bends it laterally into engagement with the contact finger 34b which is, in turn, bent laterally into engagement with the contact finger 34c. On the other hand, when the lever 22 is pivoted in a clockwise direction out of its normal position, the tip end 32 of the lever first engages the contact finger 35a and bends it laterally into engagement with the contact finger 35b which is thereafter bent laterally into contact with the contact finger 35c.

Secured to the insulating base 25 radially outside the tube 11 in concentric relation to each other and to the rotational axis of the wheel axle 14 are three closely spaced collector or slip rings 37, 38 and 39. The slip ring 37 is connected by a wire 41 to the two inner contact fingers 34a and 35a, the slip ring 38 is connected by a wire 42 to the next adjacent pair of contact fingers 34b and 35b, and the slip ring 39 is connected by a wire 43 to the outside contact fingers 34c and 35c.

Mounted in any suitable manner as by a brush holder device, not shown, attached to the journal box at the end of the wheel axle 14 are a plurality of brushes 47, 48 and 49 that slidably contact the respective slip rings 37, 38 and 39.

In order to guard against the development of undesired pressures within the tube 11 due to the difference in the expansion characteristics between the fluid contained within the tube and the material of which the tube is composed, a thermal expansion device may be provided, shown in the form of a bellows 51 of flexible material which is suitably attached, as by welding, to the tube 11 to provide a variable volume open to the tubular chamber formed within the tube 11. The bellows 51 is arranged radially, as shown, and a coil spring 52 is interposed between the end of the bellows and the shelf 33 to resist the expansion of the bellows 51 except in response to temperature changes. In other words, the inertia forces on the body of fluid within the tube will be insufficient to compress the spring 52 and expand the bellows 51.

It should be apparent that the contact fingers 34a, 34b and 34c and, in a similar manner, the contact fingers 35a, 35b and 35c form in effect two switches adapted to be closed in succession with increasing pivotal displacement of the lever 22 out of its normal centered position, the electrical connections to the contact fingers from a stationary point being established by means of the brushes 47, 48 and 49 and the slip rings 37, 38 and 39. It will accordingly be apparent that electrical circuits may be controlled by the contact fingers for any desired purpose.

For the purpose of demonstrating a specific application of the inertia device shown in Fig. 1, I have illustrated diagrammatically and in fragmentary form a fluid pressure operated vehicle brake equipment which will now be briefly described.

The brake equipment shown in Fig. 1 comprises a brake cylinder 55 adapted upon the supply of fluid under pressure thereto to effect the application of suitable brake shoes, not shown, to exert a braking force on the car wheel 15 or axle 14, a reservoir 56 charged with fluid under pressure in any suitable manner, a differential diaphragm magnet valve device 57 of the type shown and described in detail in Patent 2,140,620 to Clyde C. Farmer, a fluid pressure operated switch device 58, and a source of electrical current such as a storage battery 59.

Valve mechanism 57 comprises briefly a self-lapping relay valve device for controlling the supply of fluid under pressure from the reservoir 56 to the brake cylinder 55 and the release of fluid under pressure from the brake cylinder 55, an operating device for the relay valve device in the form of a pair of axially spaced diaphragms of different areas arranged in the casing of the valve mechanism so as to form chambers respectively associated with the diaphragms, and a pair of magnet valve devices 61 and 62 for controlling the supply of fluid under pressure to and the release of fluid under pressure from the chambers associated with the respective diaphragms.

The arrangement of the magnet valve devices 61 and 62 is such that when the electromagnet windings thereof are both deenergized, the magnet valve devices establish communication through which fluid under pressure may be supplied from a control pipe 60 to the respective chambers at one side of each of the diaphragms. Control pipe 60 is normally at atmospheric pressure and is charged to a desired degree of fluid pressure by a manually operated control or brake valve (not shown).

When the magnet valve device 61 is energized, it cuts off the communication from the control pipe 60 to the chamber associated with the smaller of the two diaphragms and at the same time vents fluid under pressure therefrom. In a similar manner, when the magnet valve 62 is energized it cuts off the supply of fluid under pressure from pipe 60 to the chamber associated with the larger of the diaphragms and simultaneously vents fluid under pressure therefrom.

When the magnet valve device 62 is energized it actuates a switch contact member 63 into engagement with a pair of fixed contact members 64 for the purpose of establishing a holding circuit to maintain the electromagnet winding of the magnet valve device energized thereafter as long as the pressure operated switch 58 is in closed position.

The pressure operated switch 58 is subject to the pressure in the control pipe 60 and comprises a contact member 65 which is actuated into contact with a pair of contact members 66 when the pressure in the control pipe exceeds a relatively low pressure, such as five pounds per square inch.

One of the contact members 66 of the pressure switch 58 is connected by a wire 68 to one terminal, hereinafter referred to as the positive terminal, of the battery 59. The other contact member 66 of the pressure switch 58 is connected by a wire 69 to the brush 47 of the inertia device.

Brush 48 of the inertia device is connected by a wire 71 to one terminal of the electromagnet winding of the magnet valve device 61, while the other terminal of the electromagnet winding is connected to the negative terminal of the battery 59, as by a ground connection in the manner shown.

The brush 49 of the inertia device is connected, as by a wire 72, to one of the contact members 64 of the magnet valve device 62 and one terminal of the electromagnet winding thereof. The other contact member 64 of the magnet valve device 62 is connected by a branch wire 73 to the wire 69 and the other terminal of the electromagnet winding of the magnet valve device 62 is connected to the negative terminal of the battery 59 as by a ground connection in the manner shown.

It will be recalled that it was previously stated that when the inertia device is employed in connection with a brake control equipment the spring 31 associated with the actuating lever 22 for the contact fingers of the inertia device are tensioned so as to prevent operation of the contact fingers unless the rate of rotative retardation of the axle 14 and car wheel 15 exceeds a rate corresponding to a seven mile per hour per second rate of retardation of the car or vehicle. Such a rate of rotative retardation will not usually be attained by the vehicle wheel and axle unless the vehicle wheel is slipping, that is, decelerating from a rotative speed corresponding to the speed of the vehicle toward a locked-wheel position, due to the applied braking force exceeding the adhesion between the wheel and the rail or road surface on which it rolls.

It will be apparent, therefore, that the inertia device may be employed to so control the magnet valve devices 61 and 62 of the valve mechanism 57 as to instantly effect a reduction of brake cylinder pressure when the vehicle wheel begins to slip, thereby causing the vehicle wheel to cease deceleration and begin to accelerate back toward a rotative speed corresponding to vehicle speed without decelerating to a locked-wheel state and sliding.

To illustrate the control of the valve mechanism 57 exercised by the inertia device, let it be assumed that the operator has charged the control pipe 60 to a desired pressure so that the valve mechanism 57 is operated to supply fluid under pressure to the brake cylinder 55 to effect application of the brakes to a degree corresponding to the pressure established in the control pipe and that such degree of application of the brakes causes the vehicle wheel to slip. Assuming a counterclockwise direction of rotation of the vehicle wheel as seen in Fig. 1, it will be seen that the deceleration of the vehicle wheel at a rate exceeding the seven mile per hour per second rate will cause the actuating lever 22 of the inertia device to be shifted in a counter-clockwise direction on the pin 23, due to the tendency of the annular column of liquid in the tube 11 to continue at its original rotative speed and consequently exerting a force on the plunger 16 sufficient to displace the lever 22 against the resisting force of the coil spring 31 associated with the right-hand plunger 28. In such case, the successive engagement of the contact finger 34a with the contact finger 34b and the engagement of the contact finger 34b with the contact finger 34c correspondingly completes the circuits for energizing the magnet valve device 61 and the magnet valve device 62.

The circuit for energizing the magnet valve device 61 extends from the positive terminal of the battery 59 through wire 68, pressure switch 58 now closed due to the pressure in the control pipe 60, wire 69, brush 47, slip ring 37, wire 41, contact finger 34a, contact finger 34b, wire 42, slip ring 38, brush 48, wire 71, electromagnet winding of the magnet valve device 61 and to the negative terminal of the battery 59 through the ground connection shown.

The circuit for energizing the electromagnet winding of the magnet valve device 62 extends from the positive terminal of the battery 59 to the contact finger 34a as just described, thence by way of the contact finger 34b, contact finger 34c, wire 43, slip ring 39, brush 49 wire 72, electromagnet winding of the magnet valve device 62 to the negative terminal of the battery 59 through the ground connection shown.

Upon the simultaneous energization of the magnet valve devices 61 and 62, fluid under pressure, previously supplied to the chambers associated with the operating diaphragms of the self-lapping valve device forming a part of the valve mechanism 57, is locally vented under the control of the magnet valve devices. The self-lapping valve device of the valve mechanism 57 is thus correspondingly and instantly operated to release fluid under pressure locally from the brake cylinder 55 so as to release the brakes associated with the car wheel 15.

When the magnet valve device 62 is energized, contact member 63 is actuated into contact with the contact members 64 as previously stated and a holding circuit for maintaining the magnet of the magnet valve device 62 energized thereafter is accordingly established. This holding circuit extends from the positive terminal of the battery 59 through the wire 68 and pressure switch 58 to the wire 69, and thence by way of the branch wire 73, contact members 64 and 63 of the magnet valve device 62, wire 72, and electromagnet winding of the magnet valve device 62 to the negative terminal of the battery 59 through the ground connection shown.

When the fluid under pressure is rapidly released from the brake cylinder 55 and the brakes correspondingly released, the vehicle wheel 15 ceases to decelerate toward a locked-wheel state and begins to accelerate at a very rapid rate back toward a rotative speed corresponding to the vehicle speed. Accordingly, the vehicle wheel axle 14 tends to over-speed the fluid in the annular tube 11 and consequently the inertia force of the fluid in the tube is reversed and acts in the opposite direction to shift the plunger 16 reversely so as to pivot the actuating lever 22 in a clockwise direction on the pin 23 thus causing the contact fingers 34a, 34b and 34c to be returned to their normal separated positions and causing the contact fingers 35a, 35b and 35c to be mutually engaged in the manner previously described.

The rate of acceleration of the vehicle wheel back toward a speed corresponding to vehicle speed is at least as great as the rate of deceleration during the slipping interval and it will thus be apparent that sufficient inertia forces will be exerted by the fluid in tube 11 on the plunger 16 to shift the actuating lever 22 to effect the engagement of the contact fingers 35a, 35b and 35c.

It will be understood that when the vehicle wheel changes from deceleration to acceleration, the actuating lever 22 is shifted to its normal position momentarily and thus the energizing circuits of the magnet valve devices 61 and 62 are interrupted momentarily. However, due to the previously described holding circuit for the magnet valve device 62 the momentary interruption of the initial energizing circuit for the magnet valve device 62 is of no effect. However, the magnet valve device 61 is momentarily deenergized and fluid under pressure may be momentarily resupplied by valve mechanism 57 to the brake cylinder 55 but the magnet valve device 61 is immediately reenergized and consequently the valve mechanism 57 is again operated to vent such fluid under pressure from the brake cylinder.

When the vehicle wheel approaches sufficiently close to a rotative speed corresponding to vehicle speed and the rate of acceleration thereof reduces below the rate required to overcome the spring 31 associated with the actuating lever 22, the spring 31 will return the lever 22 to its normal position and the contact fingers 35a, 35b and 35c will be returned to their normal separated positions. At such time, the interruption of the energizing circuit of the magnet valve device 61 causes it to be deenergized and fluid under pressure is accordingly resupplied from the control pipe 60 to the chamber associated with the smaller of the diaphragms. The magnet valve device 62, however, remains energized due to the previously described holding circuit and consequently fluid under pressure is not resupplied to the chamber associated with the larger of the diaphagms.

The pressure established in the brake cylinder 55 depends in part on the pressure acting on the diaphragms and in part on the particular diaphragm effective to operate the self-lapping valve device of the valve mechanism 57. Thus with the given pressure established in the control pipe 60, the restoration of fluid pressure on only the smaller of the diaphragms establishes a lesser operating force on the self-lapping valve device and consequently a lesser pressure is established in the brake cylinder 55 in accordance with the ratio of the area of the two diaphragms.

It will thus be seen that the inertia device functions to instantly and rapidly release fluid under pressure from brake cylinder 55 so as to prevent a slipping wheel from decelerating to a locked-wheel condition and sliding and also, when the vehicle wheel is restored substantially to a rotative speed corresponding to vehicle speed once more, to reestablish a brake cylinder pressure which is less than that which initiated the slipping. Thus recurrence of slipping is rendered unlikely.

When a vehicle comes to a stop as a result of an application of the brakes, the brakes may be released prior to again starting the car by merely reducing the pressure in the control pipe 60 to atmospheric pressure so as to vent fluid under pressure from the chambers associated with the operating diaphragms of the self-lapping valve device of the valve mechanism 57. When the pressure in the control pipe 60 is reduced to atmospheric pressure, pressure switch 58 opens all of the circuits to the magnet valve devices 61 and 62, including the holding circuit for the magnet valve device 62, and the magnet valve devices are accordingly restored to their normal deenergized positions.

It will be apparent that if the vehicle wheel is rotating in a clockwise direction, that is opposite to the previously assumed direction of rotation, at the time slipping of the car wheel occurs, the inertia device will operate, in a similar manner, to effect the same operation of the valve mechanism 57 as that just described.

It should be understood that while I have illustratively described an application of the inertia device of my invention in a vehicle brake control equipment so as to prevent sliding of the vehicle wheels only, the inertia device may be employed to control the brake cylinder pressure so as to regulate the rate of retardation of the vehicle to a substantially constant rate. In such case, the coil springs 31 for centering the actuating lever 22 of the contact fingers may be adjusted to permit displacement of the actuating lever sufficient to cause engagement of the first two contact fingers at a rate of retardation of the vehicle such as three miles per hour per second and engagement of the last two contact fingers at a rate of retardation of the vehicle of three and a half or four miles per hour per second. In such case, the brake control equipment controlled by the inertia device may comprise a cut-off magnet valve device and a release magnet valve device controlled solely by the engagement of the first two and last two contact fingers respectively.

*Embodiment shown in Figs. 3, 4, 5 and 6*

Referring to Figs. 3 to 6, another embodiment of an inertia device of the fluid type is disclosed. In this embodiment, the specific manner of application to the end of a car wheel axle and its relation to the usual journal housing surrounding the axle is shown. Furthermore the device is adapted to be secured as a unit to the end of the axle, the contact fingers or switch mechanism is substantially enclosed, and a novel slip ring arrangement is provided for establishing electrical connection from the stationary axle journal housing to the contact fingers of the inertia device.

As seen in Figs. 3 and 4, a disc-like casing 11a is provided having an annular chamber therein for containing a fluid in the manner of the annular tube 11 of Fig. 1. The casing 11a is secured to the end of the axle 14 by a plurality of screws 13a for rotation on an axis coincident with the rotational axis of the axle 14.

The annular chamber in the casing 11a is open at one point thereof and each open end is respectively closed by a Sylphon bellows 81 suitably welded or bonded to the casing, thereby forming a closed chamber and eliminating the possibility of leakage of fluid out of the chamber.

The outer closed ends of the two bellows 81 face each other in spaced relation and are provided with suitable bearing members 82 thereon having complementary spherical recesses for receiving the spherical knob-like end on the actuating lever 22a, corresponding to the actuating lever 22 shown in Fig. 1. The lever 22a is pivoted at a point close to the knob-like end of the lever 22a on a pin 23a suitably fixed to the casing 11a.

Suitably attached to the casing 11a, as by a plurality of screws 84, is an insulating base 85 that is circular in form and has two arcuate side walls 86 for supporting an outer end cover 87 of insulating material in parallel spaced relation to the insulating base 85. As will be seen in Figs. 4 and 5, the end cover 87 and the base 85 are provided with suitable holes for receiving the securing screws or bolts 84 which serve to hold the end cover 87 and the insulating base 85 together as well as to secure both to the casing 11a.

As seen especially in Fig. 5, a plurality of flexible resilient contact fingers 95a, 95b, 96a, and 96b are disposed in the space between the insulating base 85 and end cover 87, the contact fingers being attached to angle brackets 97 which are in turn secured to the insulating base by screws 98. The contact fingers are preferably formed of steel except for the tip or contact ends thereof which may be of special low resistance metal.

The insulating base 85 is secured to the casing 11a in such a position that the actuating lever 22a extends radially with respect to the axis of the car axle 14 substantially midway between the side walls 86 of the insulating base, the inner end of the actuating lever terminating slightly beyond the axis of the axle 14.

The contact fingers 95a and 96a are secured to the insulating base 85 so as to be disposed in parallel relation to each other and for opposite sides respectively of the actuating lever 22a, the securing brackets 97 being fixed near the periphery of the insulating base 85 and the free end of the contact fingers being separated by the insulating tip 32 provided on the end of the actuating lever.

The contact fingers 95b and 96b are similarly arranged in parallel relation to each other on opposite sides respectively of the actuating lever 22a, the securing brackets 97 thereof being fixed near the periphery of the insulating base 85 at a point diametrically opposite those of the contact fingers 95a and 96a, while the contact or tip ends of the contact fingers terminate adjacent to but out of contact with the contact fingers 95a and 96a respectively.

A suitable adjusting screw 101 for each of the contact fingers is carried by and secured to the bracket 97 of the corresponding contact finger by suitable nuts 102. As will be seen in Fig. 5, suitable stops 103, formed as projecting lugs on the insulating base 85, are provided for limiting the movement of the respective contact fingers in the direction of the actuating lever 22a under the influence of the corresponding adjusting screw 101. Thus the more tightly a contact finger is pressed against its corresponding stop 103 by the adjusting screw 101 therefor, the greater is the force required to flex or bend the contact finger out of its normal position shown in Fig. 5 in a direction away from the actuating lever. This feature of adjusting the tension of the contact fingers will be referred to hereinafter as more fully explained as to the functions and advantages thereof.

Disposed radially outwardly with respect to and in line with the contact end of the contact finger 95b so as to be engaged thereby when the contact finger is bent laterally from its normal position is a contact member 105 which is secured to and carried by a projecting lug formed on the insulating base 85. In a similar manner a contact member 106 is provided radially outward of the contact finger 96b and is adapted to be engaged by the contact tip of the contact finger 96b when it is bent laterally away from the actuating lever 22a.

It should now be apparent that the arrangement of the contact fingers 95a, 95b, 96a, 96b and the contact members 105 and 106 correspond in nature and function to that of the contact fingers described in the embodiment shown in Fig. 1. Thus, when the actuating lever 22a is rocked on the pivot pin 23a in a counterclockwise direction as seen in Fig. 5 the contact finger 95a is first bent laterally until the contact end thereof engages the contact end of the contact finger 95b. Thereafter, when the force displacing the actuating lever 22a increases sufficiently to overcome the additional tension of the contact finger 95b, the contact fingers 95a and 95b are bent together laterally until the contact end of the contact finger 95b engages the contact member 105 to limit further displacement or bending of the contact fingers.

In a similar manner, when the actuating lever 22a is pivotally rocked in a clockwise direction, the contact end of the contact finger 96a is shifted laterally into engagement with the contact end of the contact finger 96b and, thereafter, upon an increasing displacing force being exerted on the actuating lever 22a sufficient to overcome the added tension of the contact finger 96b, the two contact fingers are further bent laterally out of their normal positions until the contact end of the contact finger 96b engages contact member 106.

It will be apparent that the individual adjusting screws 101 of the contact fingers enables adjustment of each contact finger so that the closing of electrical circuits may be effected at any desired rate of rotative deceleration and acceleration of the car wheel axle 14, thereby adapting the device for operation either as a retardation controller or as a device for guarding against the sliding of the vehicle wheels.

According to my invention, a novel arrangement for establishing electrical connections to the contact fingers and contact members 105 and 106 of the inertia device is provided in the form of a removable plug 111 similar in appearance and nature to the plugs employed in telephone switch boards. As shown in Fig. 4, the plug 111 is adapted to be inserted in a suitable socket or bore 112 located in coaxial alignment with the rotational axis of the car wheel axle 14 and provided in an end cover 113 that is adapted to be secured in conventional manner to the outer end of the journal 115 supporting the axle 14. In Fig. 3, only the end of the journal 115 is shown, the end cover 113 being removed.

The plug 111 is provided with three longitudinally spaced slip ring elements 119, 121 and 122, of successively increasing diameters in the order mentioned, arranged in insulated relation with respect to one another and the body of the plug 111, the slip ring elements 119, 121 and 122 having wires, corresponding to the wires 69, 71 and 72 of the embodiment of Fig. 1, respectively connected thereto through the body of the plug, in the conventional manner of telephone switch board plugs.

When the plug 111 is fully inserted in the socket 112 the slip ring elements 119, 121 and 122 are respectively engaged between corresponding pairs of contact spring prongs 125, 126 and 127.

The pairs of prongs 125, 126 and 127 are connected to and integrally formed with corresponding connecting straps 135, 136 and 137 secured in the insulating end cover 87 attached to the insulating base 85. In practice, the pairs of prongs and their connecting straps are embedded in the insulating end cover 87 when the end cover is formed or moulded of material, such as Bakelite.

Each of the straps 135, 136 and 137 has a terminal post 145, 146 and 147, respectively, which projects out of the inner face of the insulating end cover 87 opposite the prongs and is threaded to receive suitable nuts for securing electric wires thereto.

The terminal post 145 for the prongs 125 is connected by a wire 155 to the contact fingers 95a and 96a, the wire 155 having two branches which are respectively secured to the brackets 97 of the contact fingers under the attaching screw 98 therefor.

In a similar manner, the terminal post 146 for the prongs 126 is connected by a wire 156 to the two contact fingers 95b and 96b, the wire 156 having two branches that are respectively secured to the brackets 97 of the corresponding contact fingers under the securing screws 98 therefor.

The terminal post 147 for the prongs 127 is connected by a wire 157 to the two contact members 105 and 106, which are provided with suitable terminal posts to which two branches of the wire 157 are respectively connected.

It should thus be apparent that as the car wheel axle 14 rotates, the contact fingers 95a and 96a are constantly connected through the prongs 125 and slip ring element 119 to the wire 69. Also, the contact fingers 95b and 96b are constantly connected through the prongs 126 and slip ring element 121 to the wire 71, and contact members 105 and 106 are constantly connected through the prongs 127 and slip ring element 122 to the wire 72.

Accordingly, when the contact finger 95a is shifted into contact with the contact finger 95b, a circuit corresponding to that previously traced in connection with Fig. 1 is established for energizing the magnet valve device 61 of the valve mechanism 57. Also, when the contact finger 95b is bent into contact with the contact member 105, a circuit corresponding to that previously described in connection with Fig. 1 is established for energizing the magnet valve device 62.

Likewise, the engagement of the contact finger 96a with the contact finger 96b establishes a circuit for energizing the magnet valve device 61 and the engagement of the contact 96b with the contact member 106 establishes a circuit for energizing the magnet valve device 62.

In view of the description of the operation of the inertia device shown in Fig. 1, it is believed unnecessary to describe the operation of the embodiment shown in Figs. 3 to 6 inasmuch as such operation is equivalent to that of the device shown in Fig. 1.

For simplicity, I have omitted a thermal expansion device corresponding to the bellows 51 shown in Fig. 1 from the embodiment shown in Figs. 3 to 6 but it will be understood that such feature may be employed in and applied to the device shown in the latter embodiment.

It will be observed however that in the embodiment shown in Fig. 1, the provision and arrangement of the coil springs 31 is such that selective adjustment of the amount of inertia force exerted on the actuating lever 22 to operate successive contact fingers cannot be effected since the adjustment of the tension of the spring 31 affects the operation of all contact fingers by the actuating lever. As distinguished from such construction, each of the contact fingers in the embodiment shown in Figs. 3 to 6 is individually adjustable in tension so that the engagement of the contact finger 95a for example with the contact finger 95b may be effected at a certain rate of rotative retardation or acceleration of the car wheel axle and the engagement of the contact finger 95b with the contact member 105 may be effected at any desired rate of rotative retardation or acceleration of the car axle 14. Thus it will be seen that the selective adjustment of the individual contact fingers is a particular feature of the second described embodiment which is not present in the first described embodiment.

While I have shown and described only two embodiments of my invention, it should be apparent that various omissions, additions or modifications may be made in the embodiments shown without departing from the spirit of the invention. It is accordingly not my intention to limit the scope of my invention except as it is necessitated by the scope of the prior art.

Having now described my invention, what I claim as new and desire to secure by Letters Patent, is:

1. A device for registering the rate of change of rotative speed of a rotary member, comprising a casing having an annular chamber in which is confined a body of liquid, said casing being adapted to be rotated on an axis that intersects the center of curvature of the annular chamber and in accordance with the speed of rotation of the rotary member, and means operatively controlled by the inertia forces exerted by the body of liquid in accordance with the rate of change of rotative speed of said casing.

2. A device for registering the rate of change of rotative speed of a rotary member, comprising a casing having an annular chamber in which is confined a body of liquid, said casing being adapted to be rotated on an axis that intersects the center of curvature of the annular chamber and according to the speed of rotation of the rotary member, pressure responsive means on which the inertia force of the body of liquid is exerted in varying degree according to the rate of change of rotative speed of said casing, and means operative by movement of said pressure responsive means.

3. A device for registering the rate of change of rotative speed of a rotary member, comprising a casing having a tubular chamber therein formed in the shape of an annulus and having two adjacent open ends, a movable abutment interposed between the open ends of the tubular chamber and cooperating with the casing in a manner to close the open ends of the chamber, a body of liquid filling said tubular chamber, said casing being adapted to be rotated on an axis intersecting the center of curvature of the tubular chamber and according to the speed of rotation of the rotary member, whereby said movable abutment is subject to the inertia forces of the body of liquid and shifted in one direction or the other out of a normal position in accordance with the direction and degree of inertia force, and means operative in response to the movement of said abutment.

4. A device for registering the rate of change of rotative speed of a rotary member, comprising a casing having an annular chamber in which is confined a body of liquid, said casing being adapted to be rotated on an axis that intersects the center of curvature of the annular chamber and according to the speed of rotation of the rotary member, pressure responsive means on which the inertia force of the body of liquid is exerted in varying degree according to the rate of change of rotative speed of said casing, switch means adapted to be operated by movement of the pressure responsive means, and means for establishing a continuous electrical connection from the switch means to a stationary member.

5. A device for registering the rate of change of rotative speed of a rotary member, comprising a casing having an annular chamber in which is confined a body of liquid, said casing being adapted to be rotated on an axis that intersects the center of curvature of the annular chamber and according to the speed of rotation of the rotary member, pressure responsive means on which the inertia force of the body of liquid is exerted in varying degree according to the rate of change of rotative speed of said casing, switch means carried by the said casing adapted to be operated by movement of the pressure responsive means, and means including a plurality of slip rings and cooperating brushes for establishing a continuous electrical connection from the switch means to a stationary element.

6. A device for registering the rate of change of rotative speed of a rotary member, comprising a casing having an annular chamber in which is confined a body of liquid, said casing being adapted to be rotated on an axis that intersects the center of curvature of the annular chamber and according to the speed of rotation of the rotary member, pressure responsive means on which the inertia force of the body of liquid is exerted in varying degree according to the rate of change of rotative speed of said casing, switch means carried by the casing and adapted to be operated by movement of the pressure responsive means, a stationary member, a plurality of slip rings carried by the stationary member in concentric relation to the axis of rotation of the said casing, and contact members associated with the switch means and carried by the said casing for respectively contacting corresponding individual slip rings to provide a continuous electrical connection from the switch means to a point stationary with respect to said rotary member.

7. A device for registering the rate of change of rotative speed of a rotary member comprising a casing having an annular chamber in which is confined a body of liquid, said casing being adapted to be rotated on an axis that intersects the center of curvature of the annular chamber and according to the speed of rotation of the rotary member, a movable abutment subject to and movable out of a normal position in response to the inertia forces exerted thereon by the body of liquid in said chamber upon changes in the rate of rotative speed of said casing, a lever pivoted on said casing and cooperating with said abutment in a manner to be pivotally moved according to the movement of said abutment, spring means adapted to oppose pivotal movement of said lever by said abutment, and control means operative upon a predetermined degree of pivotal movement of the said lever out of its normal position.

8. A device for registering the rate of change of rotative speed of a rotary member comprising a casing having an annular chamber in which is confined a body of liquid, said casing being adapted to be rotated on an axis that intersects the center of curvature of the annular chamber and according to the speed of rotation of the rotary member, a movable abutment subject to and movable out of a normal position in response to the inertia forces exerted thereon by the body of liquid in said chamber upon changes in the rate of rotative speed of said casing, a lever pivoted on said casing and cooperating with said abutment in a manner to be pivotally moved according to the movement of said abutment, spring means adapted to oppose pivotal movement of said lever by said abutment, and switch means adapted to be operated by pivotal movement of said lever.

9. A device for registering the rate of change of rotative speed of a rotary member comprising a casing having an annular chamber in which is confined a body of liquid, said casing being adapted to be rotated on an axis that intersects the center of curvature of the annular chamber and according to the speed of rotation of the rotary member, a movable abutment subject to and movable out of a normal position in response to the inertia forces exerted thereon by the body of liquid in said chamber upon changes in the rate of rotative speed of said casing, a lever pivoted on said casing and cooperating with said abutment in a manner to be pivotally moved according to the movement of said abutment, spring means adapted to oppose pivotal movement of said lever by said abutment, switch means adapted to be operated by pivotal movement of said lever, and means for establishing a continuous electrical connection from said switch means to a point stationary with respect to said casing.

10. A device for registering the rate of change of rotative speed of a rotary member, comprising a casing having a tubular chamber arranged in the form of an annulus with two adjacent open ends, a pair of Sylphon bellows respectively closing the open ends of said tubular chamber, a body of liquid filling said tubular chamber and adapted to exert an inertia force on one or the other of said bellows to cause expansion thereof to a degree corresponding to the rate of change of rotative speed of the said casing, a lever pivoted on said casing and adapted to be pivotally moved out of a normal position in response to the expansion of one or the other of said bellows, and control means carried by the casing and adapted to be operated by pivotal movement of said lever.

11. A device for registering the rate of change of rotative speed of a rotary member, comprising a casing having a tubular chamber arranged in the form of an annulus with two adjacent open ends, a pair of Sylphon bellows respectively closing the open ends of said tubular chamber, a body of liquid filling said tubular chamber and adapted to exert an inertia force on one or the other of said bellows to cause expansion thereof to a degree corresponding to the rate of change of rotative speed of the said casing, a lever pivoted on said casing and adapted to be pivotally moved out of a normal position in response to the expansion of one or the other of said bellows, and switch means having two normally disengaged switch members adapted to be shifted into engagement upon a predetermined pivotal movement of the said lever out of its normal position.

12. A device for registering the rate of change of rotative speed of a rotary member, comprising a casing having an annular chamber in which is confined a body of liquid, said casing being adapted to be rotated on an axis that intersects the center of curvature of the annular chamber and according to the speed of rotation of the rotary member, a movable abutment subject to and movable out of a normal position in response to the inertia force exerted by the body of liquid in said annular chamber upon changes in the rate of rotative speed of said casing, a lever pivoted on said casing and adapted to be pivotally moved according to the movement of the said movable abutment, and switch means carried by the said casing including a pair of flexible resilient contact fingers and a fixed contact member, said flexible contact fingers and fixed contact member being so arranged that, upon pivotal movement of the said lever out of its normal position, one of said flexible contact fingers is shifted into contact with the other of said contact fingers and thereafter both of said contact fingers are moved together until the other of said contact fingers engages the said fixed contact member.

13. A device for registering the rate of change of rotative speed of a rotary member, comprising a casing having an annular chamber in which is confined a body of liquid, said casing being adapted to be rotated on an axis that intersects the center of curvature of the annular chamber and according to the speed of rotation of the rotary member, a movable abutment subject to and movable out of a normal position in response to the inertia force exerted by the body of liquid in said annular chamber upon changes in the rate of rotative speed of said casing, a lever pivoted on said casing and adapted to be pivotally moved according to the movement of the said movable abutment, switch means carried by the said casing including a pair of flexible resilient contact fingers and a fixed contact member, said flexible contact fingers and fixed contact member being so arranged that, upon pivotal movement of the said lever out of its normal position, one of said flexible contact fingers is shifted into contact with the other of said contact fingers and thereafter both of said contact fingers are moved together until the other of said contact fingers engages the said fixed contact member, and an individual adjusting means for each of said flexible resilient contact fingers for varying the resistance offered thereby to the movement of the said pivoted lever.

14. A device for registering the rate of change of rotative speed of a rotary member, comprising a casing having an annular chamber in which is confined a body of liquid, said casing being adapted to be rotated on an axis that intersects the center of curvature of the annular chamber and according to the speed of rotation of the rotary member, pressure operated means responsive to the inertia forces exerted thereon by the body of liquid upon changes in the rate of rotative speed of said casing, and means for preventing undesired operation of the last said means by pressure forces developed in the body of liquid due to changes in temperature.

15. A device for registering the rate of change of rotative speed of a rotary member, comprising a casing having an annular chamber in which is confined a body of liquid, said casing being adapted to be rotated on an axis that intersects the center of curvature of the annular chamber and according to the speed of rotation of the rotary member, means operative in response to the inertia forces exerted by the body of liquid upon changes in the rate of rotative speed of said casing, and means providing an expansible chamber open to the said annular chamber to accommodate the increased volume of the liquid in said annular chamber due to changes in temperature.

16. A device for registering the rate of change of rotative speed of a rotary member, comprising a casing having an annular chamber in which is confined a body of liquid, said casing being adapted to be rotated on an axis that intersects the center of curvature of the annular chamber and according to the speed of rotation of the rotary member, means operative in response to the inertia forces exerted by the body of liquid upon changes in the rate of rotative speed of said casing, means providing an expansible chamber open to the said annular chamber to accommodate the increased volume of the liquid in said annular chamber due to changes in temperature, and resilient yielding means opposing expansion of said expansible chamber except in response to pressure forces developed due to changes in temperature.

EVERETT P. SEXTON.